US005888622A

United States Patent [19]

Pinell et al.

[11] Patent Number: 5,888,622

[45] **Date of Patent: *Mar. 30, 1999**

[54] TONER ADHESION ENHANCING COATING AND COATED PAPER

[75] Inventors: William F. Pinell, Lebanon; William M. Saluke, Dayton, both of Ohio

[73] Assignee: The Standard Register Company, Dayton, Ohio

[ * ] Notice: The term of this patent shall not extend beyond the expiration date of Pat. No. 5,017,416.

[21] Appl. No.: 876,105

[22] Filed: Apr. 30, 1992

Related U.S. Application Data

[63] Continuation of Ser. No. 339,972, Apr. 18, 1989, abandoned.

[51] Int. Cl.[6] .......... B32B 3/00

[52] U.S. Cl. .......... 428/195; 428/323; 428/537.5; 428/913; 430/126; 346/135.1

[58] Field of Search .......... 346/135.1, 159, 346/160.1; 428/195, 323, 537.5, 913, 914; 430/126

[56] References Cited

U.S. PATENT DOCUMENTS

| | | | |
|---|---|---|---|
| 3,357,930 | 12/1967 | Marks et al. | 252/518 |
| 3,493,412 | 2/1970 | Johnston et al. | 117/17.5 |
| 3,873,354 | 3/1975 | Walters | 117/201 |
| 3,933,489 | 1/1976 | Walters | 96/1.4 |
| 4,016,099 | 4/1977 | Wellman et al. | 252/316 |
| 4,296,171 | 10/1981 | Imai | 428/323 |
| 4,894,306 | 1/1990 | Schubring | 430/126 |

FOREIGN PATENT DOCUMENTS

| | | |
|---|---|---|
| 57-4057 | 1/1982 | Japan . |
| 57-70537 | 5/1982 | Japan . |
| 57-204058 | 12/1982 | Japan . |
| 61-176748 | 8/1986 | Japan . |
| 1353372 | 5/1974 | United Kingdom . |
| 2085806 | 5/1982 | United Kingdom . |

OTHER PUBLICATIONS

"The Evolution of Toning Technology: Past, Present and Future," Fourth Annual Guide to Ribbons and Toner, Datek Information Services, Inc. 1983.

"New Papers for New Printers" Chemtech (1986).

"A Review of Dry and Liquid Toner Technology," The 1988 Datek Imaging Supplies Manual.

"Reduction of Toner Disturbances by the Use of Sodium Sulfate" Xerox Disclosure Journal, vol. 2 No. 3, 1977.

*Primary Examiner*—William Krynski

*Attorney, Agent, or Firm*—Kenilworth, Gottman, Hagan & Schaeff, LLP

[57] ABSTRACT

The present invention provides a coated cellulosic web product and coating composition which provides enhanced toner adhesion for documents printed using noncontact printing devices such as ion deposition printers. The toner adhesion enhancing coated cellulosic product and composition comprises a cellulosic web having first and second major surfaces with at least one of the major surfaces having coated thereon a layer of a polymeric toner receptor. The polymeric toner receptor layer preferably also includes an electrolyte to adjust the electrical conductivity of the cellulosic web to have a volume resistivity of between about $5.0\times10^9$ and $1.0\times10^{12}$ ohm cm. The toner receptor layer is applied at a coating weight of from about 0.3 to about 2.0 lb/ream. The invention provides printed documents which can withstand the normal automated handling operations commonly encountered by business documents such as checks, other MICR coded documents, bar coded documents, and the like without the flaking off or removal of the toner from the document. Further, documents printed on substrates utilizing the coating composition of the present invention have been found to have increased resistance to intentional defacement or alteration of printed information.

5 Claims, No Drawings

TONER ADHESION ENHANCING COATING AND COATED PAPER

CROSS REFERENCE TO RELATED APPLICATION

This application is a continuation of application Ser. No. 339,972, filed Apr. 18, 1989, now abandoned.

BACKGROUND OF THE INVENTION

This invention relates to an adhesion enhancing coating and coated paper for pressure fixed toner particles, and more particularly to a coating and coated paper for use in ion deposition printing applications which provides improved adhesion of the toner particles to the printed product produced.

Business forms, labels, bar codes, and security documents are printed on a wide variety of commercial printing devices. Traditional mechanical impact printers have been used in the past for many of these applications, especially in the imprinting of information on security documents such as checks. The mechanical impact produced by the printers, whether based on formed characters or dot matrix, generally provides information which adheres quite well to the underlying paper document. However, such mechanical impact printers have limited speed, high noise levels, and high costs for parts and maintenance.

With the advance of microcomputer technology, a number of faster printing methods have been developed to take advantage of the high-speed printing output which is now possible. Recently developed nonimpact printers are fast, quiet, and potentially more reliable because of fewer moving parts. Ion deposition printers are one class of these newer nonimpact printers. Such printers operate by directing a computer-controlled stream of ions in a specific pattern onto an image cylinder or drum to form a latent image.

As the image cylinder is rotated, toner particles from a toner cartridge are deposited on the image areas on the cylinder and held there by the charged ions. As the image cylinder continues to rotate, the now visible toner image on the cylinder is then transferred to a paper web which has the correct level of conductivity required. Typically, a solid roller is positioned opposite the image cylinder and exerts pressure on the toner and web to simultaneously transfer and fix the toner to the web.

Descriptions of noncontact printers such as ion deposition printers, the toners used therein, and the papers used for printing on them are known. See, for example, "The evolution of Toning Technology: Past, Present, and Future", Fourth Annual Guide to Ribbons and Toner, Product Overview and Industry Directory published by Datek Information Services, Inc.(1983); "New Papers for New Printers", Chemtech (1986); and "A review of Dry and Liquid Toner Technology", The 1988 Datek Imaging Supplies Manual, all of the disclosures of which are hereby incorporated by reference.

While ion deposition printing is fast and quiet, the process has had significant limitations which have prevented its wide use in printing certain types of documents such as checks, other security documents, labels, and documents having bar code information thereon. These limitations include the inability to achieve satisfactory toner bonding on a large variety of paper products used to make such documents. For example, documents such as checks which contain not only payee and amount information but also MICR coding for automated handling must be able to withstand multiple handling and sorting cycles in high speed automated machinery. If the toner containing information such as MICR or bar coding on the document flakes off or is otherwise removed during such operations, the document will be rejected from the system and will have to be handled manually.

Additionally, because of the lack of strong adherence of toner to paper, documents printed using ion deposition printers are subject to deliberate alteration by counterfeiters, forgers, and the like. For example, check amounts and/or payee information may be readily scraped off and new amounts substituted by the unscrupulous. While it may be possible to employ additional heat fusing steps to adhere the toner particles to paper as the information is printed, this adds an additional stage to the printing process, and care must be taken not to overheat or melt the toner particles or scorch the paper stock.

Still further, papers used in ion deposition printing systems must have a very narrow range of volume and surface resistivities to insure that the toner image is properly transferred from the image cylinder or drum. Such papers are also required to have a relatively high degree of surface smoothness and flatness, a specific range of moisture contents, and resistance to curl. Fabrication of special papers to have these characteristics increases the costs of such papers and their use.

Accordingly, there remains a need in the art for a paper product which provides enhanced toner adhesion for noncontact printed products without the drawbacks of prior art products.

SUMMARY OF THE INVENTION

The present invention meets that need by providing a coated cellulosic web product and coating composition which provides enhanced toner adhesion for documents printed using noncontact printing devices such as ion deposition printers. In accordance with one embodiment of the invention, a toner adhesion enhancing coated cellulosic product is provided which comprises a cellulosic web having first and second major surfaces with at least one of the major surfaces having coated thereon a layer of a polymeric toner receptor. The web may be either continuous or in sheet form.

The polymeric toner receptor layer preferably also includes an electrolyte to adjust the electrical conductivity of the cellulosic web to have a volume resistivity of between about $5.0\times10^{9}$ and $1.0\times10^{12}$ ohm cm, and most preferably about $3.0\times10^{10}$ and $2.5\times10^{11}$ ohm cm. The toner receptor layer is applied at a coating weight of from about 0.3 to about 2.0 lb/ream (17×22, 500 sheet ream)(0.7 to 4.6 lbs per 3000 $ft^2$), and preferably between about 0.5 to about 1.0 lb/ream(1.15 to 2.3 lbs per 3000 $ft^2$).

The polymeric toner receptor component of the receptor layer is selected from the group consisting of carboxylated styrene-butadiene latexes, styrene-butadiene latexes, alkyd resins, olefin waxes and emulsions, acrylic resins, phenolic resins, and polyvinyl alcohol. Such polymers, when applied as a toner receptor layer in accordance with the present invention, have been found to enhance the adhesion of toner commonly used in such noncontact printing devices to the underlying cellulosic web. The electrolyte may be chosen from a number of suitable salts such as, for example, sodium chloride. The electrolyte is preferably added to the toner receptor composition in an amount of from between about 0.25 to 6.0 parts per 100 parts of the polymer toner receptor.

The toner receptor layer may also optionally contain an antioxidant, an optical brightener, and a filler. The antioxidant serves to prevent the toner receptor layer from yellowing or otherwise discoloring or degrading and is added to the toner receptor composition in an amount sufficient to prevent degradation of the polymer component of the composition. A preferred antioxidant is a hindered phenol which may be present in an amount of between about 0.3 to about 0.9, and most preferably about 0.6 parts per 100 parts of polymer toner receptor (dry basis).

The optical brightener is also optionally added to the toner receptor composition and serves to improve the brightness of duller cellulosic substrates while enhancing the appearance of the toner printed thereon. The optical brightener may also be an agent which fluoresces. Where this is true, a checking procedure is provided by which the coated web may be inspected under ultraviolet light to detect whether the applied coating completely covers the web. Preferably, the optical brightener is added to the toner receptor composition in an amount between about 0.01 to about 0.05 parts, and most preferably about 0.02 parts, per 100 parts of polymer toner receptor (dry basis).

Finally, the toner receptor layer may also optionally contain a filler such as calcium carbonate. Such a filler acts as an antiblocking agent to prevent the coated cellulosic web from blocking to itself when rolled. The filler is preferably added in an amount of between about 10 to about 75 parts per 100 parts of polymer toner receptor (dry basis), and most preferably between about 47 to about 63 parts per 100 parts polymer toner receptor. To insure that the filler is properly dispersed in the toner receptor composition, a small amount of a dispersant may also be added.

The toner adhesion enhancing composition of the present invention may be prepared as an aqueous solution containing from about 40 to about 60% solids, and preferably about 45 to about 55% solids. The aqueous solution has a relatively low viscosity which renders it readily coated onto cellulosic web products by any of a number of conventional techniques. Such coating techniques include, for example, offset gravure coating, direct blade coating, roll coating, and air knife coating. Further, the coating may be applied directly on a paper making machine to the cellulosic web such as by the use of a size press, gate roll, twin gate roll, blade, or bill blade roll coaters.

In a preferred embodiment of the invention, a method of enhancing toner adhesion to a cellulosic web product is provided comprising the steps of coating at least one major surface of a cellulosic web product with an aqueous polymeric toner receptor composition comprising from about 0.3 to about 0.9 parts of an antioxidant, from about 0.01 to about 0.05 parts of an optical brightener, from about 0.25 to about 4.0 parts of an electrolyte, from about 47 to about 63 parts of a filler, and about 100 parts of a polymeric toner receptor, all parts on a dry weight basis. The coating is preferably applied as a 40 to 60% solids, and most preferably 45 to 55% solids, solution. The coating is then dried conventionally to provide a coated cellulosic product having a final moisture content of between about 3.5 to about 6.0%, and most preferably of between about 4.7 to about 5.7% by weight.

Further, the coated cellulosic product and coating composition of the present invention is advantageously used in noncontact printing processes to produce documents which have enhanced toner adhesion. In a preferred embodiment of the invention, a method of printing a document using a noncontact printing device is provided comprising the steps of forming a latent image of the document on an imaging drum, applying a toner to the latent image, transferring the latent image to a surface of a cellulosic web product having coated thereon a polymeric toner receptor layer including an electrolyte, the toner receptor layer being applied at a coating weight of from about 0.3 to about 2.0 lb/ream, and the cellulosic web having a volume resistivity of between about $5.0\times10^{9}$ and $1.0\times10^{12}$ ohm cm, and thereafter fixing the toner to the surface of the cellulosic product by the application of pressure.

The toner adhesion enhancing coated cellulosic web product and composition of the present invention has been found to be of particular utility in connection with noncontact printing devices such as ion deposition printers which fix the toner to the paper web through the use of pressure alone. The invention provides printed documents which can withstand the normal automated handling operations commonly encountered by business documents such as checks, other MICR coded documents, bar coded documents, and the like without the flaking off or removal of the toner from the document. Further, documents printed on substrates utilizing the coating composition of the present invention have been found to have increased resistance to intentional defacement or alteration of printed information.

Accordingly, it is an object of the present invention to provide a coated cellulosic web product, coating composition, and method for enhanced toner adhesion for documents printed using noncontact printing devices such as ion deposition printers. This, and other objects and advantages of the present invention, will become apparent from the following detailed description and the appended claims.

DETAILED DESCRIPTION OF THE PREFERRED EMBODIMENTS

With the availability of high speed noncontact printing devices, the capability to use such printing devices for high volume printing of security documents, checks, bar coded documents, and the like is desirable. However, heretofore, the toner particles deposited onto printed documents and fixed there by the noncontact printing devices has been less than satisfactory for a number of reasons. In particular, the toner images forming MICR codes or bar codes must adhere sufficiently to the document that the codes may be read by automated equipment through several handling cycles. Thus, the images must remain dense, and the edges of the characters well-defined in order that optical machinery can correctly read the information.

Additionally, information printed on such documents must be resistant to defacement and/or intentional alteration. Further, the document and in particular the surface of the document which is to be printed must also possess a number of attributes to render it suitable for use with nonimpact printers. Initially, the document must be capable of being printed first by conventional offset and/or flexographic printing presses to contain repetitive background information. Further, the document and surface must be compatible with a number of other business forms related operations including perforating, slitting, gluing, punching, and the like.

The document must have the correct range of moisture and electrical properties which render it receptive to the toners used by noncontact printing devices. The document surface must also be receptive to being printed upon by a variety of other printing implements including typewriters, pens, and pencils. Finally, the document surface must be able to resist degradation resulting from rough handling, heat, and/or light exposure experienced during printing, storage, and use.

The coated cellulosic product and coating composition of the present invention meets all of those requirements while enhancing the adhesion of toner to the surfaces of these products. In its preferred form, the coated cellulosic product includes a polymeric toner receptor layer which has a polymeric toner receptor composition in combination with an electrolyte to adjust the electrical conductivity of the cellulosic web to have a volume resistivity of between about $5.0 \times 10^9$ and $1.0 \times 10^{12}$ ohm cm. The toner receptor layer is applied at a coating weight of from about 0.3 to about 2.0 lb/ream (17×22, 500 sheet ream), and preferably between about 0.5 to about 1.0 lb/ream.

The polymeric toner receptor component of the receptor layer is selected from the group consisting of carboxylated styrene-butadiene latexes, styrene-butadiene latexes, alkyd resins, alefin waxes and emulsions, acrylic resins, phenolic resins, and polyvinyl alcohol. For example, a series of carboxylated styrene-butadiene latexes suitable for use in the present invention are available from the Dow Chemical Company under the designations Dow 615NA and 620NA. Other suitable polymeric materials include an acrylic resin emulsion available from Morton Thiokol, Inc. under the designation Lucidene 604, a phenolic resin dispersion available from Schenectady Chemicals under the designation HRJ 4002, an alkyd resin dispersion available from National Lead Chemicals under the designation Arolon 580-W-45, a polyethylene emulsion available from Michelman Chemical Company under the designation Michelube 687, a polyethylene/paraffin wax emulsion available from Johnson Wax Company under the designation Jon Wax 120, a styrene-butadiene latex available from Goodyear Tire and Rubber Company under the designation Goodrite 1800X73, and a polyvinyl alcohol available from Air Products and Chemicals, Inc. under the designation Vinol 107. All of these polymeric materials have suitably high surface tensions which permit intimate contact with the toner particles.

Such polymers, when applied as a toner receptor layer in accordance with the present invention, have been found to enhance the adhesion of toner commonly used in such noncontact printing devices to the underlying cellulosic web. The electrolyte may be chosen from a number of suitable salts such as, for example, sodium chloride. A relatively high purity electrolyte product is preferred for use. The electrolyte is preferably added to the toner receptor composition in an amount of from between about 0.25 to 6.0 parts per 100 parts of the polymer toner receptor, depending upon the need to adjust the volume resistivity of a given cellulosic web product.

The toner receptor layer may also optionally contain an antioxidant, an optical brightener, and a filler. The antioxidant serves to prevent the toner receptor layer from yellowing or otherwise discoloring or degrading and is added to the toner receptor composition in an amount sufficient to prevent degradation of the polymer component of the composition. A preferred antioxidant is a hindered phenol available from Textile Rubber and Chemical Company as a 63% solids aqueous emulsion under the designation Octolite T-424. The antioxidant may be present in an amount of between about 0.3 to about 0.9, and most preferably about 0.6 parts per 100 parts of polymer toner receptor (dry basis).

The optical brightener is also optionally added to the toner receptor composition and serves to improve the brightness of duller cellulosic substrates while enhancing the appearance of the toner printed thereon. The optical brightener may also be an agent which fluoresces. Where this is true, a checking procedure is provided by which the coated web may be inspected under ultraviolet light to detect whether the applied coating completely covers the web. Preferably, the optical brightener is a stilbene-triazine derivative available from Ciba Geigy, Corporation under the designation Tinopal PT liquid. The optical brightener is preferably added to the toner receptor composition in an amount between about 0.01 to about 0.05 parts, and most preferably about 0.02 parts, per 100 parts of polymer toner receptor (dry basis).

Finally, the toner receptor layer may also optionally contain a filler such as calcium carbonate, clay, talc, aluminum trihydrate, or other known mineral fillers. Additionally, organic fillers such as polystyrene, melamine formaldehyde, urea formaldehyde, and other so-called plastic pigments used in paper coatings may also be used. Such a filler acts as an antiblocking agent to prevent the coated cellulosic web from blocking to itself when coated on both surfaces and rolled. A source of a preferred filler, calcium carbonate, is available from Omya, Inc. under the designation Hydrocarb 65. The filler is preferably added in an amount of between about 10 to about 75 parts, and most preferably about 47 to about 63 parts per 100 parts of polymer toner receptor (dry basis). To insure that the filler is properly dispersed in the toner receptor composition, a small amount of a dispersant such as an ammonium polyacrylate available from Also Chemical Company under the designation Alcosperse 249 may also be added.

While the toner receptor coating of the present invention is typically colorless, it is within the scope of the invention to provide coloring agents to the coating which will provide a colored surface to the coated cellulosic web. Alternatively, the underlying cellulosic web may itself be colored.

The toner adhesion enhancing composition of the present invention may be prepared as an aqueous solution containing from about 40 to about 60% solids, and preferably about 45 to about 55% solids. The aqueous solution has a relatively low viscosity (typically about 20–25 cps as measured by a #1 spindle Brookfield viscosity at 60 rpm and 75 degrees F.) which renders it readily coated onto cellulosic web products by any of a number of conventional techniques.

Such coating techniques include, for example, offset gravure coating, direct blade coating, roll coating, and air knife coating. Further, the coating may be applied directly on a paper making machine to the cellulosic web such as by the use of a size press, gate roll, twin gate roll, blade, or bill blade roll coaters. Additionally, the polymeric toner receptor coating of the present invention may be coated on one or both sides of the cellulosic web. Additionally, the receptor coating may be spot coated, by known techniques, onto predetermined portions of the cellulosic web product which are to receive toner.

A number of cellulosic web products are available which are suitable for use in the present invention. Such products provide the necessary surface qualities to be coated by the toner receptor composition. Examples of cellulosic papers include 20# and 24# Ion Deposition paper available from Boise Cascade Corporation, 24# bond paper from Champion Paper Company, 24# bond paper from Union Camp Corporation, and 60# Opaque White papers from Howard Paper Company and Kimberly Clark Corporation. The papers used in the practice of the present invention may be white or colored.

In order that the invention may be more readily understood, reference is made to the following examples, which are intended to illustrate the invention, but are not to be taken as limiting the scope thereof.

EXAMPLE 1

A polymeric toner receptor coating composition was prepared in accordance with the present invention by mixing the components listed below.

| Component | % Solids as received | dry parts basis | wet parts basis |
|---|---|---|---|
| Dow 620 carboxylated styrene-butadiene latex | 50% | 100 | 200 |
| Octolite T-424 antioxidant | 63% | 0.6 | 0.95 |
| NaCl electrolyte | dry | 4.0 | 16.0 |
| water | — | — | 47.0 |
| Alcosperse 249 dispersant | 40% | 0.03 | 0.75 |
| Hydrocarb 65 $CaCO_3$ | dry | 47.0 | 47.0 |
| Tinopal PT optical brightener | 17% | 0.02 | 0.12 |
| | | 151.65 | 311.027 |

The coating composition provided a 48.7% solids composition having a pH of about 6.3 and a Brookfield #1 spindle viscosity of 21 cps at 60 rpm and 75 degrees F. The composition was successfully coated onto a number of cellulosic substrates using an offset gravure coater at coat weights of between about 0.3 to about 0.7 lb/ream (17×22, 500 sheet ream).

EXAMPLE 2

The coating composition of Example 1 was tested to determine its toner adhesion enhancing capabilities on a number of cellulosic substrate samples as reported below. The coated substrates were printed using a Delphax Anser ion deposition printer. Uncoated control substrates were also printed for comparison purposes. Printed samples were tested for toner adherence by measuring the initial diffused reflection density of printing on the samples.

The initial diffused reflection density was measured using a Macbeth densitometer. Multiple readings were taken and then averaged to insure that a representative value was obtained. Printed samples were then evaluated by positioning a segment of 3M 811 transparent pressure sensitive adhesive tape over a printed portion of the sample without the application of any force to the tape. A brass cylinder weighing one kilo3ram was then rolled over the plate.

The adhesive tape was then peeled from the printed substrate at at least a 135 degree angle, and the final diffused reflection density of the printed area which was initially measured was measured again. Multiple readings were again taken and averaged. The density ratio, Avdr, which is the ratio of the final to initial density (×100%) gave a percentage figure which was representative of the degree to which the toner-based image adhered to the cellulosic substrate.

The results of the test are tabulated in Table I below. As can be seen, toner-based images which were fixed onto the coated cellulosic substrates of the present invention shown greatly enhanced adhesion versus uncoated substrates. Even where the paper used was designed specifically for use with a noncontact printer, such as an ion deposition printer, the results using the present invention were significantly improved.

TABLE I

| Substrate | Density ratio Avdr* Uncoated | Density ratio Avdr* Coated |
|---|---|---|
| Boise Cascade 20# Ion Deposition paper | 50.0 | 95.0 |
| Boise Cascade 24# Ion Deposition paper | 45.0 | 94.4 |
| Champion 24# bond | 55.6 | 96.8 |
| Union Camp 24# bond | 49.6 | 96.9 |
| Howard 60# opaque white | 49.7 | 95.7 |
| Kimberly Clark 60# opaque white | 44.4 | 97.6 |

*- Avdr = final diffused reflection density/ initial diffused reflection density × 100%

While certain representative embodiments and details have been shown for purposes of illustrating the invention, it will be apparent to those skilled in the art that various changes in the methods and apparatus disclosed herein may be made without departing from the scope of the invention, which is defined in the appended claims.

What is claimed is:

1. A sheet or web useful in ion deposition printing employing a polymeric-based toner and comprising a sheet or web substrate, a coating on at least one surface of said substrate which enhances the adhesion of said toner adhered to said coated surface, said coating comprising a polymeric latex wherein when said toner disposed on said coated surface is subjected to transfixation in an unheated nip, said toner is retained on said coated surface in an amount which is greater than the amount of toner retained on an uncoated surface of said substrate after toner on said coated and uncoated surfaces has been subjected to a tape test, and wherein said polymeric latex is present on said substrate in an amount of between about 0.7 and about 4.6 lbs. per 3000 $ft^2$ of substrate surface.

2. The sheet or web of claim 1 wherein said polymeric latex is selected from the group consisting of carboxylated styrene-butadiene latexes, styrene-butadiene latexes, alkyd resin dispersions, olefin waxes and emulsions, acrylic resin emulsions, phenolic resin dispersions, and polyvinyl alcohol.

3. The sheet or web of claim 1 wherein said polymeric latex coating is an acrylic polymer.

4. The sheet or web of claim 1 wherein said coating is applied to both surfaces of said substrate.

5. A sheet or web useful in ion deposition printing employing a polymeric-based toner and comprising a sheet or web substrate, a coating on at least one surface of said substrate which enhances the adhesion of said toner to said coated surface, said coating comprising a carboxylated styrene-butadiene latex wherein when said toner disposed on said coated surface is subjected to transfixation in an unheated nip, from about 94.4 to about 97.6% of said toner is retained on said coated surface after said coated surface has been subjected to a tape test, and wherein said carboxylated styrene-butadiene latex is present on said substrate in an amount of between about 0.7 and about 1.6 lbs. per 3000 $ft^2$ of substrate surface.

* * * * *